United States Patent [19]

Furuta et al.

[11] Patent Number: 5,415,820

[45] Date of Patent: May 16, 1995

[54] METHOD OF MAKING PHOTO-SOLIDIFIED OBJECT HAVING UNSOLIDIFIED LIQUID EJECTING PORTS

[75] Inventors: Kei Furuta; Jie Wei; Seiji Hayano, all of Ota, Japan

[73] Assignee: CMET, Inc., Tokyo, Japan

[21] Appl. No.: 126,565

[22] Filed: Sep. 27, 1993

[30] Foreign Application Priority Data

Oct. 1, 1992 [JP] Japan .................................. 4-289652

[51] Int. Cl.⁶ .................... B29C 35/08; B29C 41/02
[52] U.S. Cl. ................................. 264/22; 156/273.5; 156/275.5; 156/307.1; 264/308; 427/510; 427/512; 427/553
[58] Field of Search ............. 264/22, 308; 156/273.3, 156/273.5, 275.5, 307.1; 427/508, 510, 512, 553

[56] References Cited

U.S. PATENT DOCUMENTS

| | | | |
|---|---|---|---|
| 4,752,498 | 6/1988 | Fudim | 427/510 |
| 5,182,055 | 1/1993 | Allison et al. | 264/22 |

FOREIGN PATENT DOCUMENTS

| | | |
|---|---|---|
| 250121 | 12/1987 | European Pat. Off. . |
| 322257 | 6/1989 | European Pat. Off. . |
| 484183 | 5/1992 | European Pat. Off. . |
| 4-118222 | 4/1992 | Japan . |

OTHER PUBLICATIONS

"Review of Scientific Instruments", vol. 52, No. 11, Nov. 1981.

*Primary Examiner*—Leo B. Tentoni
*Attorney, Agent, or Firm*—Oliff & Berridge

[57] ABSTRACT

A superficial model with an inner reinforcing structure having communication ports formed for communication among cells defined by ribs constructing a honeycomb structure. For this purpose, a process of temporarily stopping light exposure is added in a light exposure process for modeling ribs. Alternatively, a process of offsetting phases of ribs is added in the light exposure process for modeling ribs.

3 Claims, 10 Drawing Sheets

METHOD OF MAKING PHOTO-SOLIDIFIED OBJECT HAVING UNSOLIDIFIED LIQUID EJECTING PORTS

BACKGROUND OF THE INVENTION

1. Field of the Invention

The present invention relates to improvement in a photo-solidification modeling method and a photo-solidified object fabricated by the method.

2. Description of the Prior Art

There has been proposed a photo-solidification modeling method for embodying a three-dimensional shape which is defined by a three-dimensional data designed by a three-dimensional CAD or the like. The photo-solidification modeling method is useful for embodying the three-dimensional shape which is defined in data but not embodied yet in an actual shape. The summary of the photo-solidification modeling method is disclosed in Rev. Sci. Instrum. Vol.52(11) November 1981, p.1770–1773.

In order to reduce the required time of the photo-solidification modeling method or to use the solidified method as a casting model, there has been proposed an improved technique of fabricating a hollow object (which may be referred to as a superficial model) by exposing a liquid photo-solidifying resin to a light only at a region corresponding to a desired contour or outer surface of a desired shape. In order to increase the strength of the superficial model or prevent distortion thereof, there has been also proposed a technique of fabricating a solidified object having a superficial skin with a honeycomb structure formed therein. These improved techniques are disclosed in Japanese Laid-Open Patent Publication No. 4-118222 filed by the assignee of the present invention.

The technique disclosed in the above prior art publication uses a control system in which the space within the contour is spacedly exposed to a light so as to form a lattice of ribs within the superficial model.

When such a honeycomb structure is formed within the superficial model in accordance with the prior art, the space in the model is divided into a plurality of cells by the lattice of ribs of the honeycomb structure. When the ribs are arranged in a lattice, for example, in section taken in an X-Y plane of a three dimensional space (herein defined by X, Y and Z), extending uniformly in the Z direction, each of the cells defined by the ribs is of a square prism. Alternatively, if the ribs are arranged in a honeycomb in section taken in the X-Y plane, extending uniformly in the Z direction, each of the cells defined by the ribs is of a hexagonal prism. Further, if the ribs are arranged in a lattice in a section taken in any of the X-Y, Y-Z and Z-Y planes, each of the cells defined by the ribs is cubic.

Thus, the superficial model is reinforced by the ribs from inside thereof, assuring provision of a strong object with little distortion. Furthermore, the object of this construction is effective to reduce the fabricating time and the amount of a resin used for modeling in comparison with a solid model.

Though the superficial model with a honeycomb structure formed therein is advantageous as described above, it is accompanied with a problem that, as there is no communication among the cells defined by the ribs, the unsolidified liquid in the cells is confined therein and difficult to be ejected therefrom. In the known technique, such unsolidified liquid in the cells is individually ejected through small holes formed in the outer surfaces defining the respective cells, which requires a troublesome work and which is not so effective as to satisfactorily eject such unsolidified liquid. As the result, the amount of the resin used for modeling cannot be reduced so much as expected, and the unsolidified liquid not ejected from the cells will have an adverse effect when the solidified object is used as a casting model.

SUMMARY OF THE INVENTION

It is an object of the present invention to provide a photo-solidified object in which unsolidified liquid can be readily ejected from each of cells defined in a superficial model with a honeycomb structure formed therein and a method of fabricating the same.

According to the present invention, there is provided a photo-solidified object having unsolidified liquid ejecting ports, the photo-solidified object including an outer surface corresponding to a contour and a honeycomb structure supporting the outer surface from inside thereof, the outer surface and the honeycomb structure being integrally formed of a photo-solidifying resin, characterized in that there is provided communication ports at the honeycomb structure, each communication port communicating with cells defined by the honeycomb structure.

According to one aspect of the present invention, such a photo-solidified object is fabricated by a photo-solidification modeling method in which an exposure process for forming the honeycomb structure is interrupted by a process of temporarily eliminating light exposure. According to another aspect of the invention, a process of offsetting phases between sequentially stacked layers of the honeycomb structure is added to the exposure process for forming the honeycomb structure.

The photo-solidified object of the present invention has communication ports formed for mutual communication among cells, permitting flow of unsolidified liquid among the cells and thereby ready ejection of the unsolidified liquid from the cells.

According to the photo-solidification modeling method of the invention, the light exposure process for forming ribs of the honeycomb structure is interrupted by a process of eliminating light exposure to provide unsolidified portions in some of the ribs which serve as communication ports for communicating with the cells. According to the photo-solidification modeling method of another aspect of the invention, during stacking of layers of ribs, their phases are offset so as to create a clearance between the ribs which permits communication among the cells.

The present invention will be more fully understood from the following detailed description and appended claims when taken with the accompanied drawings.

DETAILED DESCRIPTION OF THE PREFERRED EMBODIMENTS

Now, several embodiments of the present invention will be described.

First Embodiment (honeycomb structure of the type in which some of ribs are eliminated)

Figure 2:
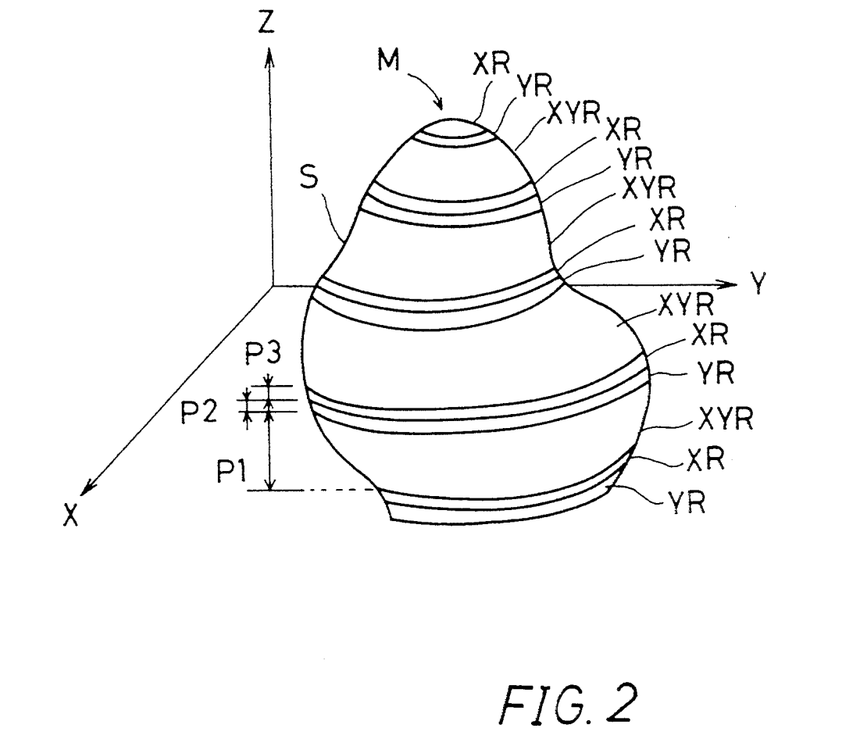
FIG. 2 shows an example of a solidified object according to the first embodiment.

In this embodiment, some of ribs constructing an inner honeycomb structure are not formed, or light exposure of some of ribs is eliminated. FIG. 2 shows an example of a photo-solidified object M which has a three-dimensional shape positioned in a three-dimensional space defined by X, Y and Z axes having an outer surface shown by a closed curved surface S and a honeycomb structure formed in a space enclosed by the outer surface. In the drawing, YR designates a region in which the honeycomb structure is composed of ribs extending only in the Y direction, XR a region in which the honeycomb structure is composed of ribs extending only in the X direction, and XYR a region in which the honeycomb structure is composed of ribs extending in the X and Y directions.

Figure 1:
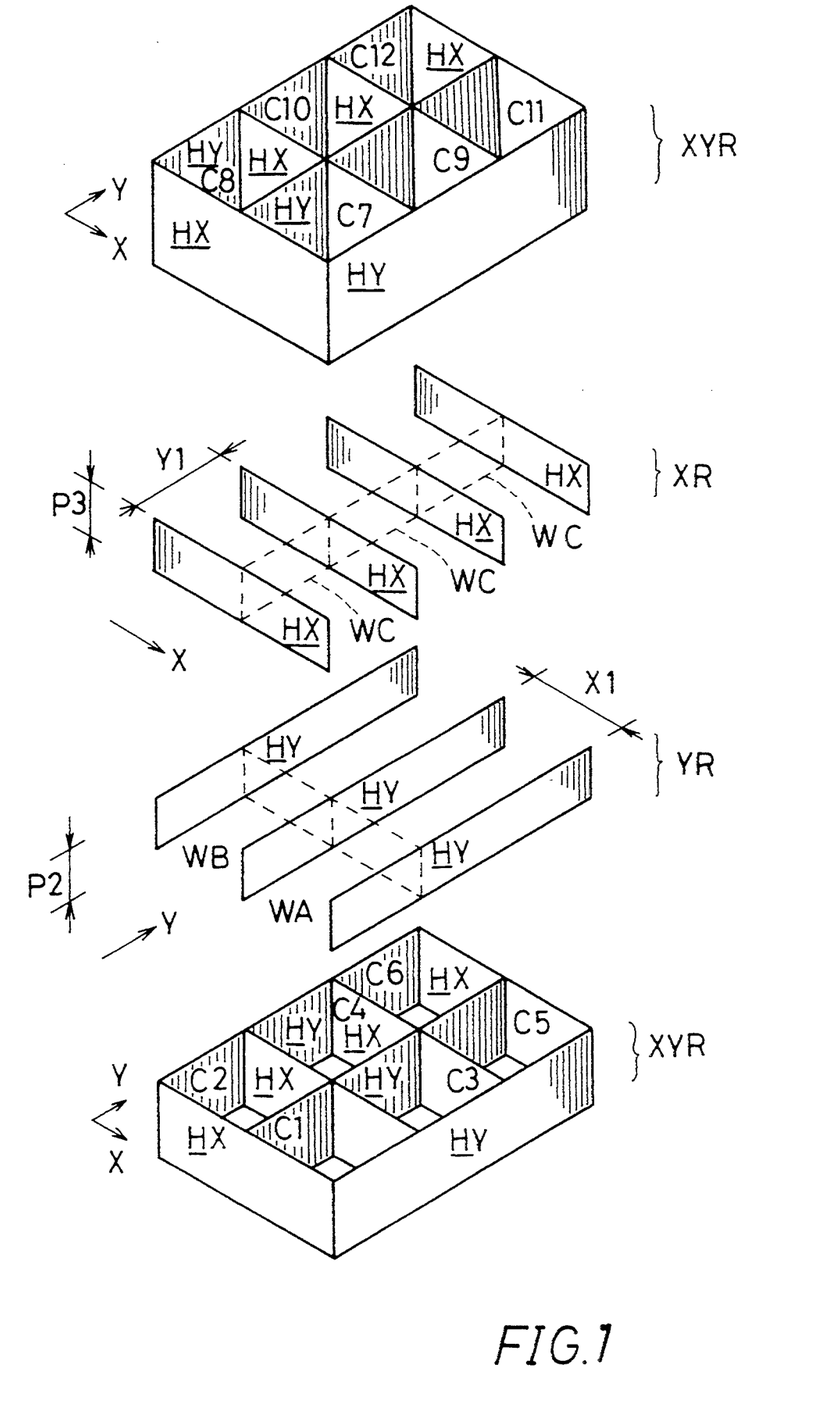
FIG. 1 shows an example of a honeycomb structure according to a first embodiment of the present invention.

FIG. 1 shows a part of the honeycomb structure in an enlarged scale, and the similar structure extends in the X, Y and Z directions. Though the regions XYR, YR and XR are shown separately for better understanding, it should be noted that they are actually continuous.

In the region XYR, ribs HX extending in the X direction and ribs HY extending in the Y direction are formed to fabricate a lattice honeycomb structure. In the region YR, the ribs HX in the X direction are eliminated and only the ribs HY in the Y direction are formed, while in the region XR, the ribs HY in the Y direction are eliminated and only the ribs HX in the X direction are formed.

In the region XYR, the ribs HX and HY arranged in a lattice define a plurality of cells C1, C2 . . . , each of the cells being separated from one another. In the region YR, however, as the ribs HX in the X direction are eliminated, the cells C1, C3 and C5 are communicated with one another, and similarly the cells C2, C4 and C6 are communicated with one another. More specifically, the cells C1 and C3 are communicated with each other through a communication port WA, and the cells C2 and C4 are communicated with each other through a communication port WB. Similar communication ports are provided between the cells C3 and C5 and between the cells C4 and C6.

In the region XR, as the ribs HY in the Y direction are eliminated, the cell group composed of C1, C3 and C5 communicating with one another in the region YR communicates with the other cell group composed of C2, C4 and C6 communicating with one another in the region YR. Specifically, the cell group C1, C3 and C5 communicates with the other cell group C2, C4 and C6 through communication ports WC. Consequently, all of the cells C1, C2 . . . C6 communicate with one another through the communication ports WA, WB, WC and others.

Also in the upper XYR region, the ribs HX and HY are formed in a lattice, defining cells C7 to C12. Communication between the cells C7 and C8, between the cells C9 and C10 and between the cells C11 and C12 is assured by the corresponding communication ports WC in the region XR, and further, the cell group C7 and C8 communicates with the cell group C9 and C10 through the communication ports WA and WB in the region YR. Thus, all of the cells C1 to C12 communicate with one another.

The communication ports WA, WB, WC and others are designed to have a dimension of more than 1 mm at the shortest side thereof so as to assure sufficient fluidability.

Figure 3:
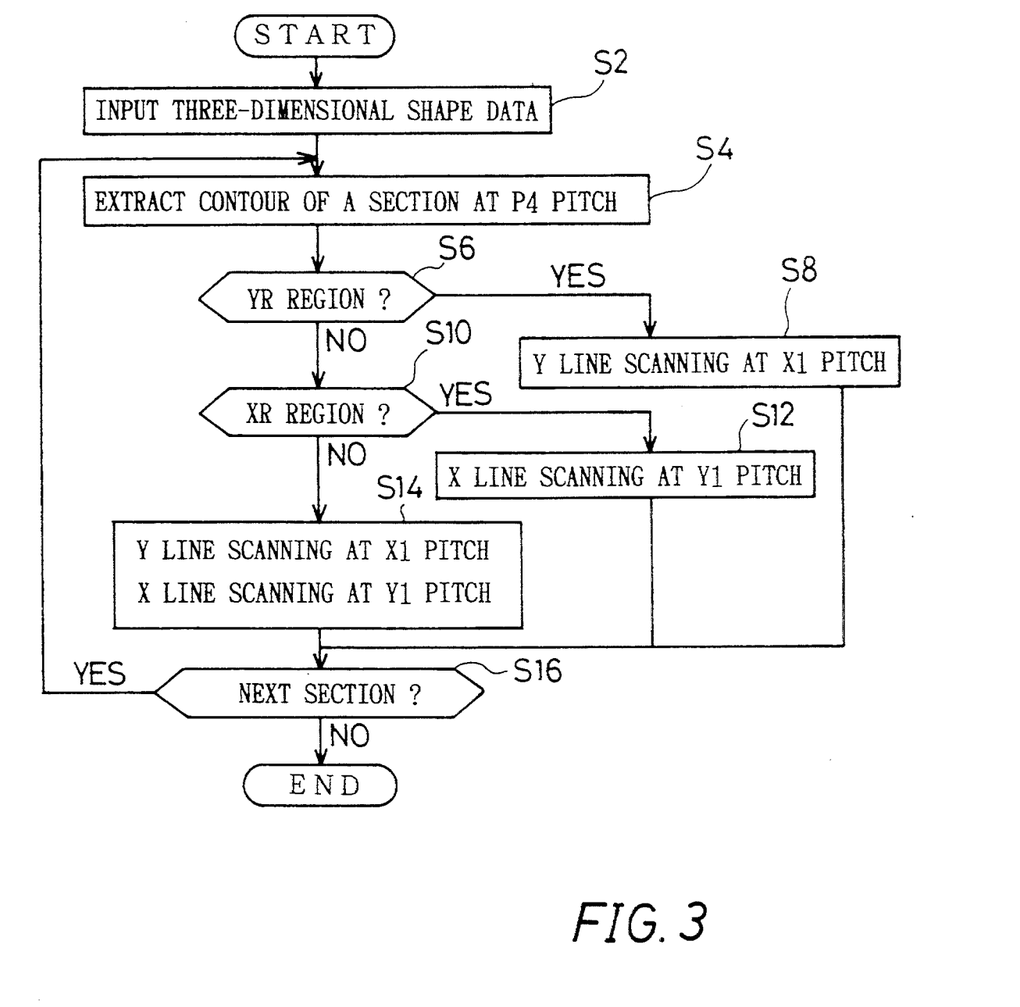
FIG. 3 is a flow chart of a modeling procedure according to the first embodiment.

Referring now to FIGS. 2 and 3, the modeling method will be described.

At first, an operator, viewing a monitor screen of a photo-solidification modeling system, sets and inputs a height P1 of the XYR region, a height P2 of the YR region, a height P3 of the XR region, and others. In this example, as shown in FIG. 2, the regions XR and YR are provided in the maximum section of the model. The regions XR and YR are also provided in the upper and lower end portions of the model. Thus designed, all of the cells can communicate with one another, so that provision of respective exits at the upper and lower end portions of the object permits ejection of unsolidified liquid from all of the cells.

Figure 4:
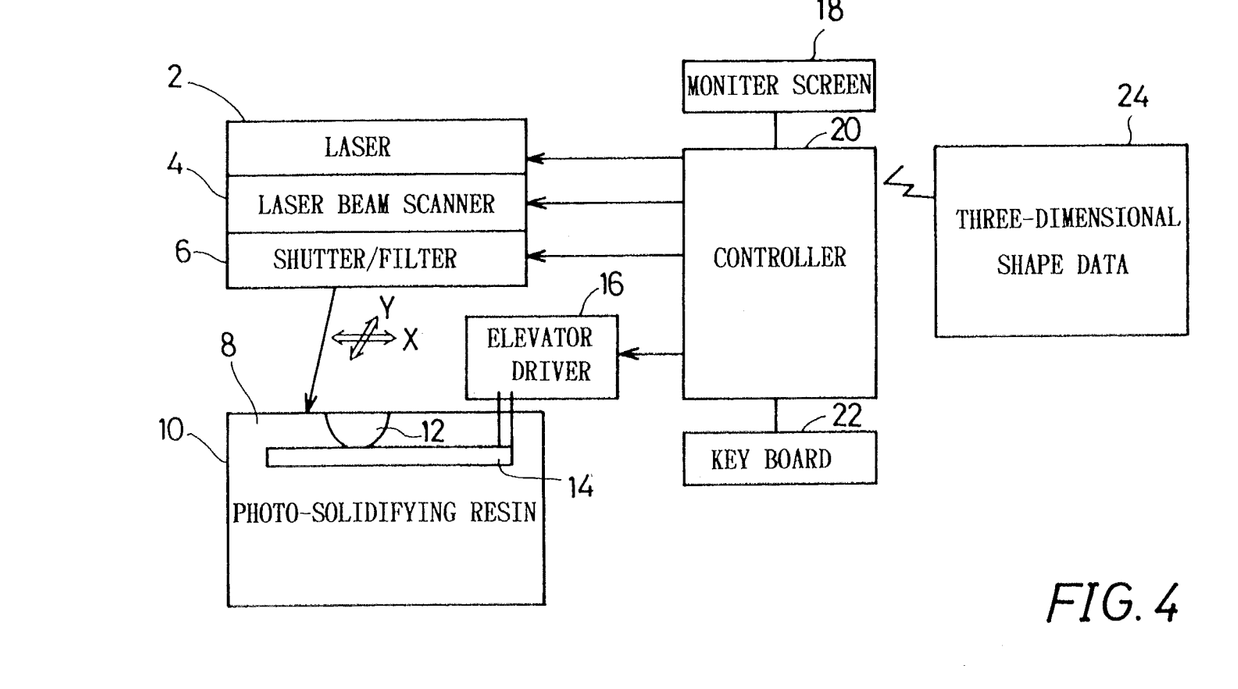
FIG. 4 shows a system construction of a photo-solidification modeling system according to the first embodiment.

FIG. 4 shows a system construction of the photo-solidification modeling system, in which a photo-solidifying resin 8 in the unsolidified state is stored in a container 10. An elevator 14 is disposed vertically movably in the container 10. The elevator 14 is actuated by an elevator driver 16 for vertical movement. A laser 2 is disposed adjacent to the container 10, and a laser beam scanner 4 is positioned so as to expose to a laser beam a desired portion of the liquid surface in the container 10. The laser beam scanner 4 may be a galvanomirror or it may be composed of an optical fiber which can be scanned by an XY plotter. A shutter/filter 6 is disposed between the laser beam scanner 4 and the liquid surface so as to adjust the strength of the laser beam including zero level. The laser 2, the laser beam scanner 4, the shutter/filter 6 and the elevator driver 16 are controlled by a controller 20. The controller 20 is a computer in which data is entered from a keyboard 22. A monitor screen 18 is provided to provide the operator with necessary information. Further, the controller 20 is connectable with a three-dimensional CAD system, a three-dimensional measuring instrument or the like so as to receive three-dimensional shape data 24. As the elevator 14 is lowered, exposure by the laser 2 is repeated to fabricate a three-dimensional photo-solidified object 12.

FIG. 3 shows a flow chart of the modeling process for the object M. At first, in Step 2, a three-dimensional shape data is entered in the controller 20. In Step S4, the three-dimensional shape data entered in Step S2 is sliced at a pitch P4 to obtain a section whose contour data is extracted. In Step S4, the lowermost section is first taken. P4 is normally determined less than 0.1 mm, which is quite smaller than P1, P2 and P3 in FIG. 2. In other words, the ribs HY and HX in the regions YR and XR in FIG. 1 are formed of stacked layers of a thickness corresponding to the pitch P4.

In Step S6 of FIG. 3, the controller 20 designates whether the section taken in Step S4 belongs to the YR region or not. If yes, the inside portion of the contour corresponding to the section is exposed to light at a pitch X1 in the Y direction in Step S8. This results in formation of the ribs HY in the Y direction as shown in the region YR in FIG. 1. At this time, light exposure for forming ribs in the X direction is eliminated.

If the controller 20 discriminates as "no" in Step S6 of FIG. 3, it then discriminates whether the section belongs to the XR region or not. If yes, the inside portion of the contour corresponding to the section is exposed to light at a pitch Y1 in the X direction in Step S12. This results in formation of the ribs HX in the X direction as shown in the region XR in FIG. 1. At this time, light exposure for forming ribs in the Y direction is eliminated.

If the controller 20 discriminates as "no" in both Steps S6 and S10, the section belongs to the XYR region, and the inside portion of the contour corresponding to the section is exposed to light at the pitch X1 in the Y direction and at the pitch Y1 in the X direction in Step S14. This results in formation of both of the ribs HX in the X direction and the ribs HY in the Y direction. When either one of the Steps S8, S12 and S14 is executed and formation of the ribs for the section is completed, control returns to Step S4 and the above procedure is repeated for a next section. Thus, the procedure is sequentially repeated for the whole sections.

In this way, the superficial model reinforced by the honeycomb structure having Y direction communication ports in the region YR and X direction communication ports in the region XR is fabricated.

Figure 5:
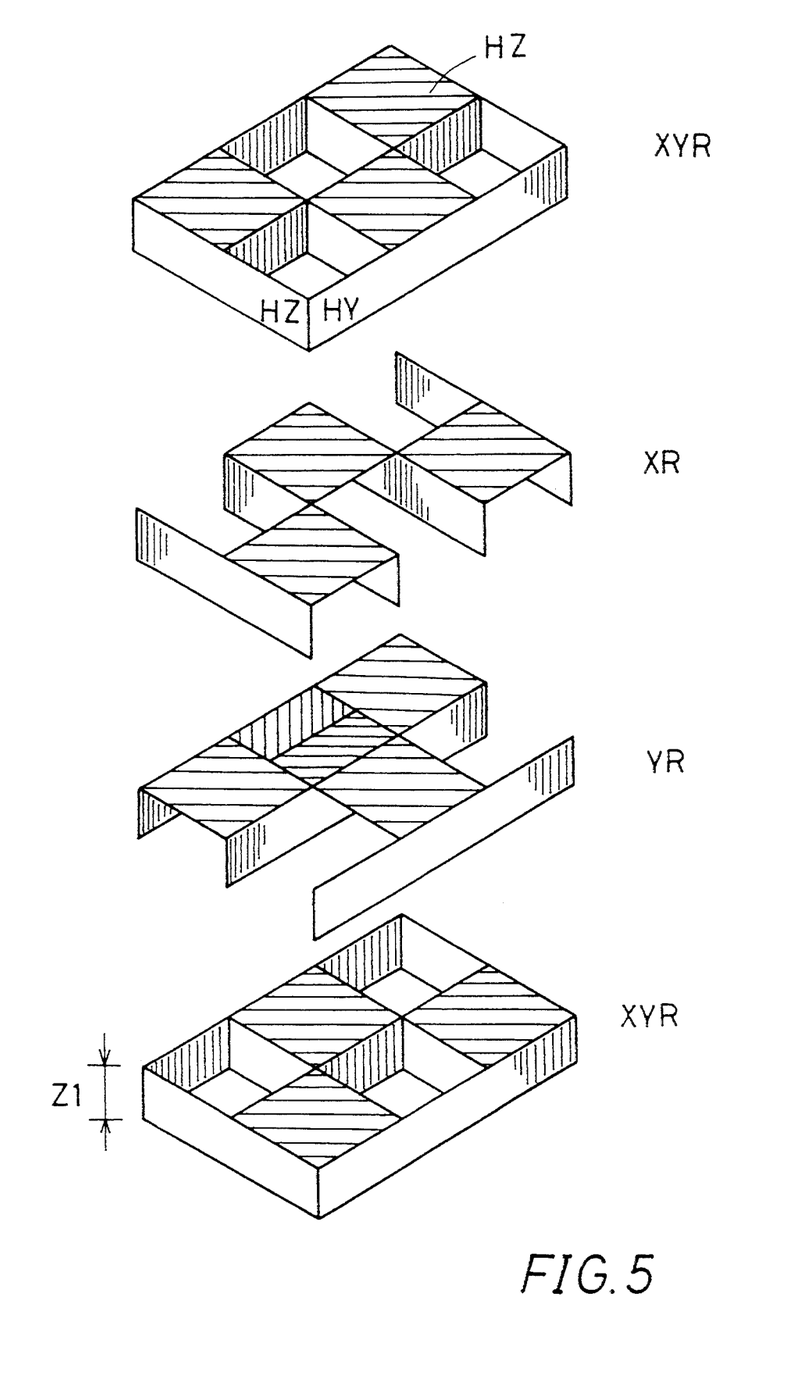
FIG. 5 shows another example of the honeycomb structure according to the first embodiment.

FIG. 5 shows an example of the honeycomb structure further having ribs HZ formed at a space in the Z direction in addition to the honeycomb structure in FIG. 1. If all of the ribs HX, HY and HZ were formed with no elimination, each of the cells would be cubic and separated from one another. In the example, however, the honeycomb structure is fabricated by sequentially stacking the XYR region, YR region, XR region and then XYR region at a pitch Z1 of the Z direction, and the ribs HZ being disposed in an alternate lattice pattern in the X-Y plane. This construction causes all of the cells to communicate with one another, permitting flow of unsolidified liquid in the superficial model. Thus, even in the honeycomb structure in a cubic lattice composed of the ribs HX, HY and HZ, communication among the cells can be assured by leaving some of the ribs unsolidified. Such a superficial honeycomb model can be fabricated by temporarily eliminating light exposure in the light exposure process for forming the ribs.

Second Embodiment (honeycomb structure of the type in which phases of ribs are offset)

Figure 6:
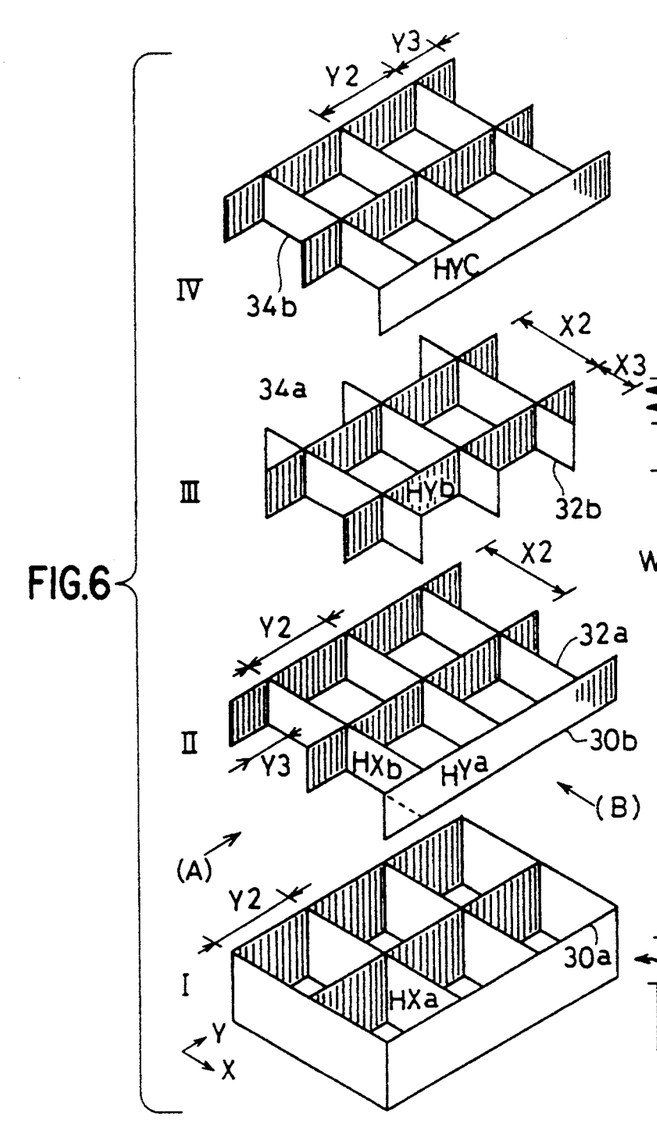
FIG. 6 shows an example of the honeycomb structure according to a second embodiment of the present invention.

FIG. 6 shows a honeycomb structure according to the second embodiment. In this structure, the X direction ribs HXb in a region II is offset by ½ pitch from the X direction ribs HXa in a region I. Also in regions II and III, the Y direction ribs HYa and HYb are offset from each other by ½ pitch. Further in regions III and IV, the Y direction ribs HYb and HYc are offset from each other by ½ pitch. Thus, this embodiment is characterized in that the pitch of the ribs is offset between adjacent regions. Though the quantity of offset is determined to be ½ pitch (i.e. Y2=2×Y3, X2=2×X3), it may be ⅓ pitch or ¼ pitch. It should be noted that the ribs, in this embodiment, are offset either in the X direction or in the Y direction between adjacent regions, so that the ribs in the direction in which the ribs are not offset are vertically continuous. For example, the ribs 30a and 30b are continuous, and the ribs 32a and 32b are continuous, and similarly the ribs 34a and 34b are continuous, resulting in firm connection of the ribs in adjacent regions and consequently provision of a strong inner honeycomb structure.

Figure 6A:
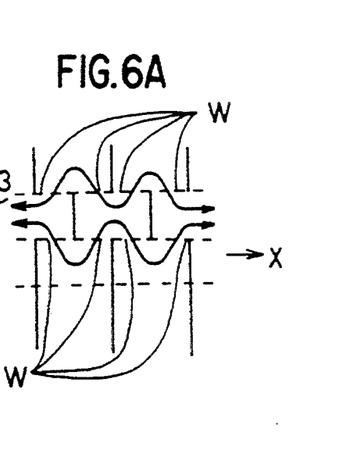
Figure 6B:
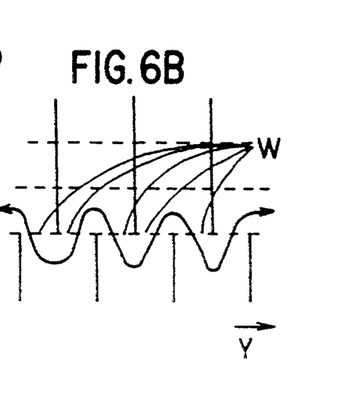

With the phases offset in this way, the cells can communicate with one another in the X, Y and Z directions. FIG. 6(A) is a view of the honeycomb structure having the regions I, II, III and IV sequentially stacked in layers as seen in the Y direction, and it will be understood that there is communication in the X direction through communication ports W. FIG. 6(B) is a view of the same as seen in the X direction, and it is also understood that there is communication in the Y direction through the communication ports W.

Figure 7:
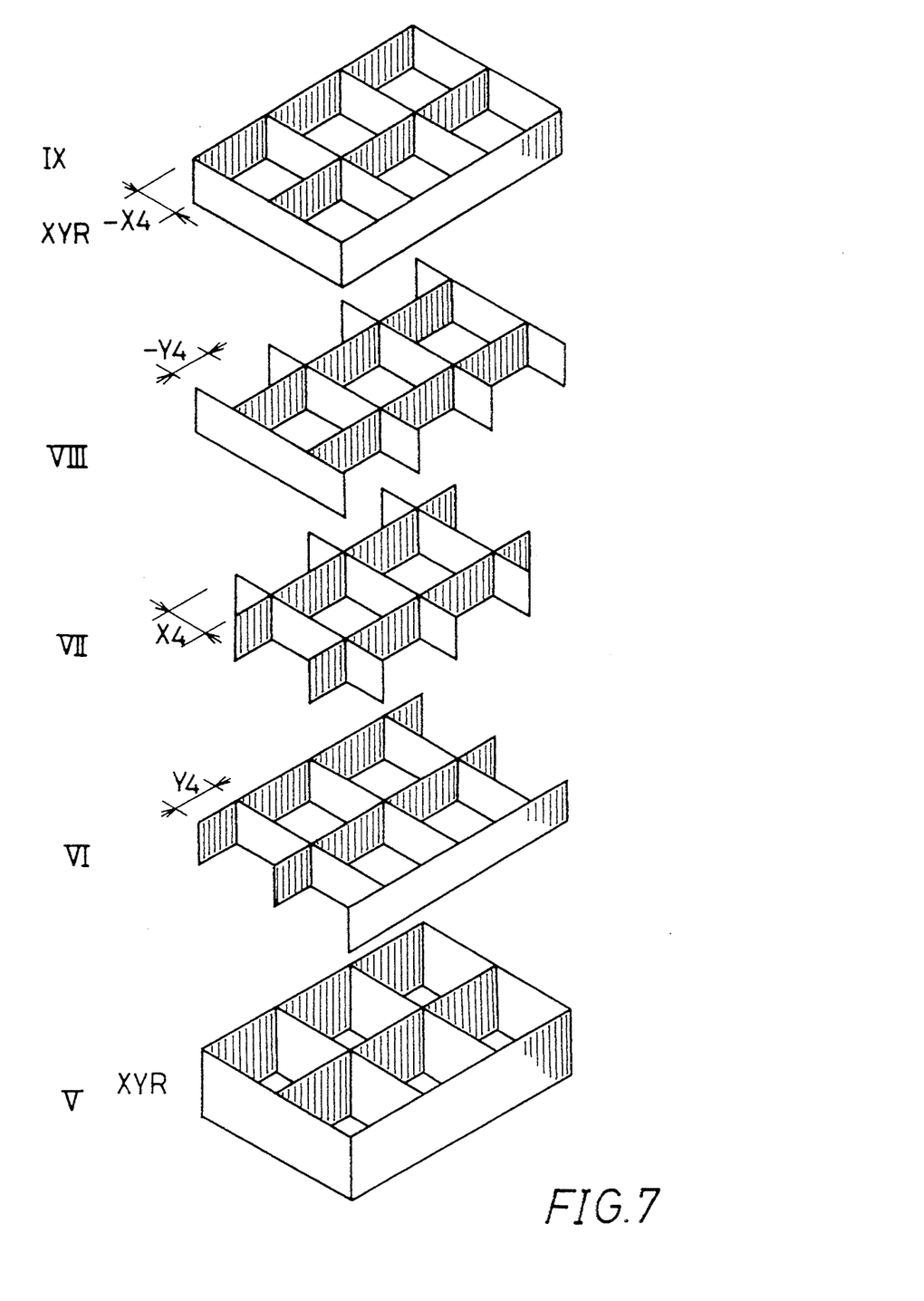
FIG. 7 shows another example of the honeycomb structure according to the second embodiment.

FIG. 7 shows another example of the second embodiment, in which the phases of the ribs are respectively offset by Y4, X4, -Y4 and -X4 in the sequential regions, so that the honeycomb structure of the region V may be of the same pattern as that of the region IX. In this example, the common pattern of the regions V and IX is preferably used in the XYR region in FIG. 2. Such an arrangement in which three phase-offset regions are provided between the two regions V and IX of the basic pattern permits usage of a common basic pattern and consequently remarkable simplification of software for offsetting the phases.

Figure 8:
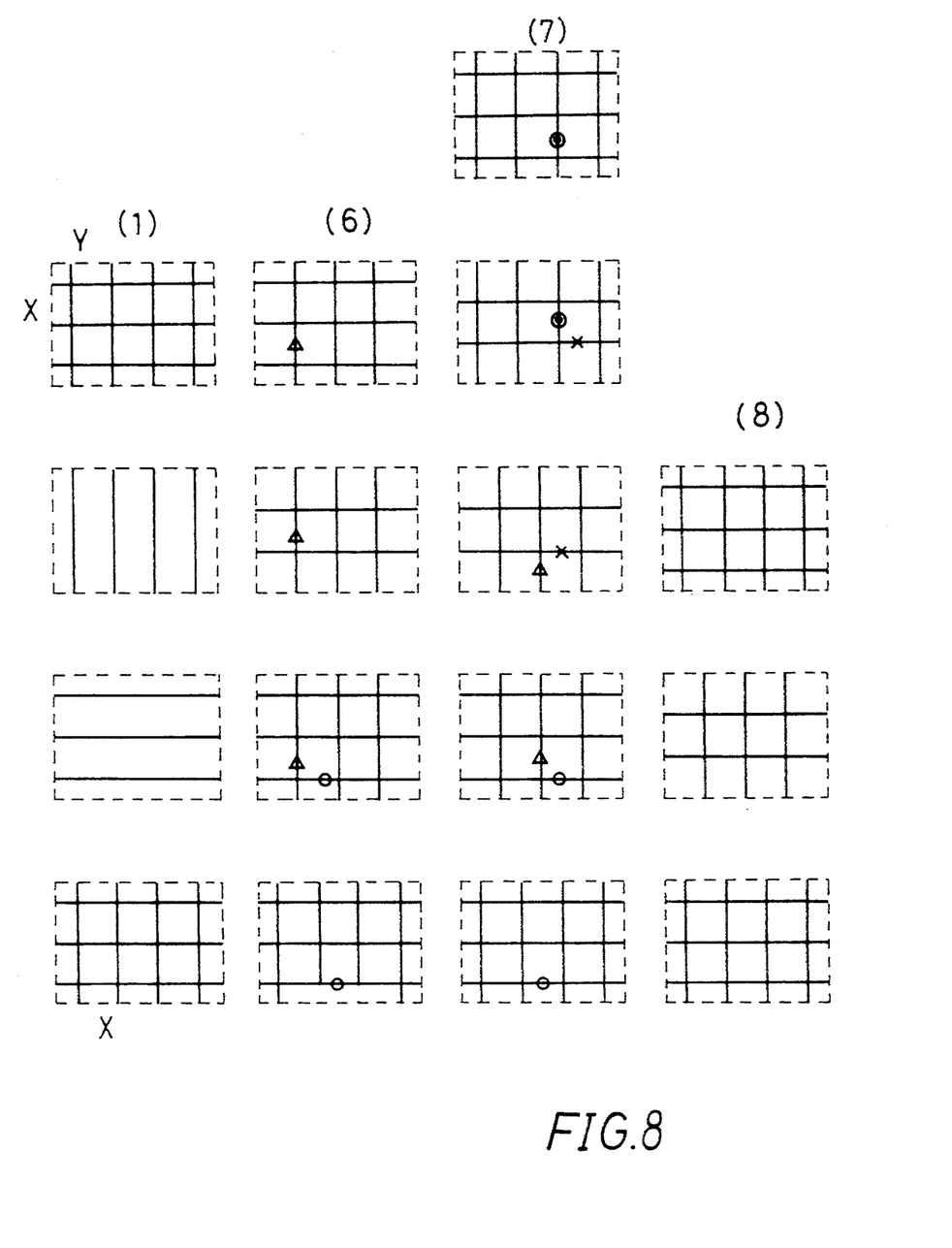
FIG. 8 are plan views of the honeycomb structures in FIGS. 1, 6 and 7.

FIG. 8 includes plan views of the ribs of the honeycomb structures in FIGS. 1, 6 and 7, showing that, in every case, the cells communicate with one another in both of the X and Y directions. In the drawing, respective marks , △ and χ show vertically continuous ribs. As shown in FIG. 8 (6), offsetting of the phases by ½ pitch in one of the X and Y directions between adjacent regions provides a strong honeycomb structure. FIG. 8(8) shows an example in which the phases are offset in both of X and Y directions in each of the regions. It is apparent that, in this example, the cells can also communicate with one another in both of the X and Y directions. In this case, however, as the upper and lower ribs are point-connected, this structure is applicable to a model which requires a relatively low strength.

Third Embodiment (the honeycomb structure of the type in which each rib is split in the plane thereof)

This embodiment is of the type in which each of the ribs constructing the honeycomb structure is split in the plane thereof. In the first and second embodiments, ribs H are spaced at a certain pitch, but they extend uniformly in the planes thereof and are spaced from one another in the direction perpendicular to the corresponding planes. On the contrary, the third embodiment is characterized in that each rib H is split in the plane thereof.

Figure 9:
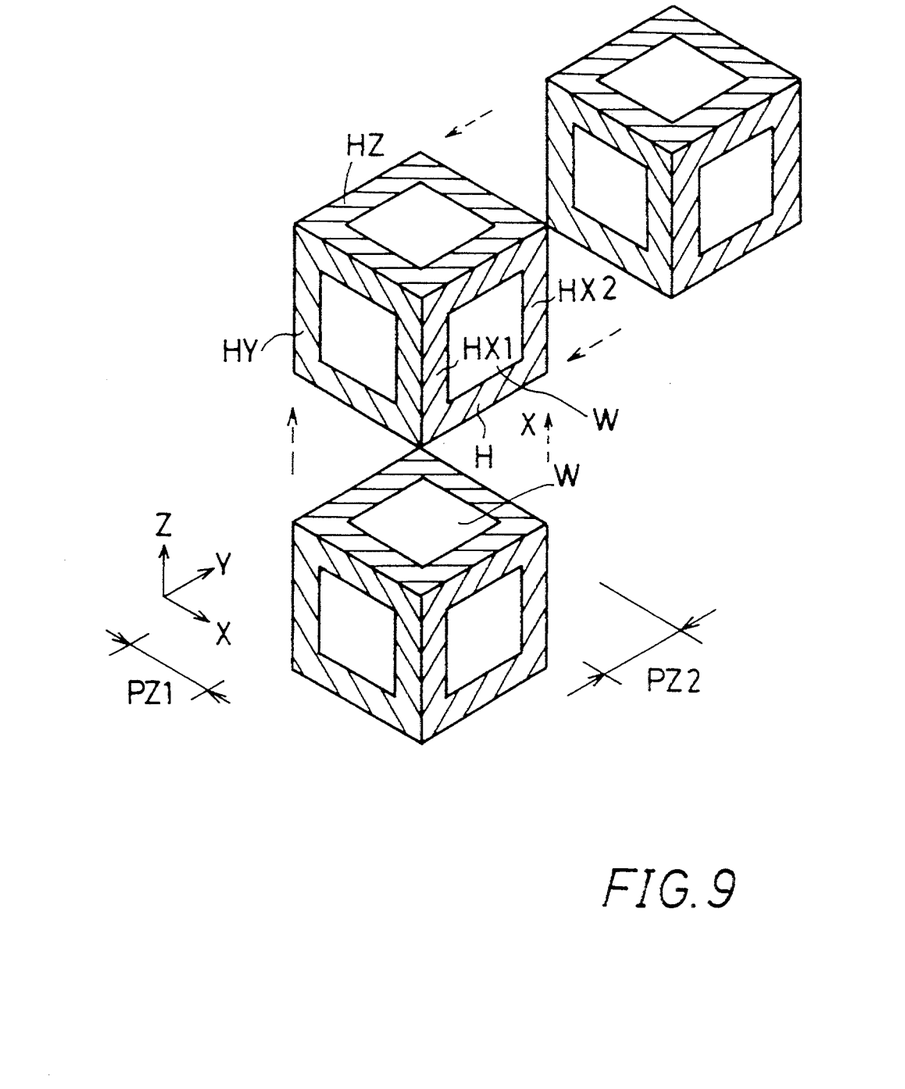
FIG. 9 shows an example of the honeycomb structure according to a third embodiment of the present invention.
Figure 10:
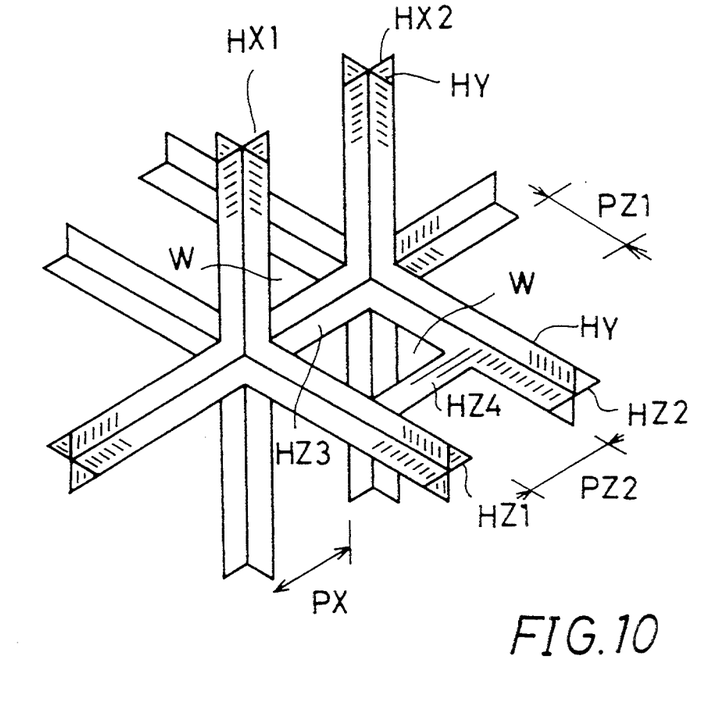
FIG. 10 is a detailed view of the honeycomb structure in FIG. 9.

FIGS. 9 and 10 show an example of such a honeycomb structure, and as shown clearly in FIG. 10, the rib HX extending in a plane perpendicular to the X axis is split into rib sections HX1 and HX2 with a space PX left therebetween. Similarly, the rib HY perpendicular to the Y axis and the rib HZ perpendicular to the Z axis are split in the respective planes at a space. A honeycomb structure fabricated by these ribs is schematically shown in FIG. 9, which has communication ports W formed in each surface of the cubic lattice. It will be more clearly understood when referring to the rib sections HZ1, HZ2, HZ3 and HZ4 perpendicular to the Z axis in FIG. 10. The rib sections HZ1 and HZ2 are separated in a plane perpendicular to the Z axis at a space PZ2. The rib sections HZ3 and HZ4 are separated at a space PZ1. Therefore, a communicating port W of PZ1×PZ2 is formed in the plane perpendicular to the Z axis.

This construction provides a honeycomb structure of a cubic lattice having a remarkable strength and large communication ports in the X, Y and Z directions which assure more ready flow of unsolidified liquid in the superficial model.

Fourth Embodiment (honeycomb structure of the type in which through holes are formed in the ribs)

Figure 11:
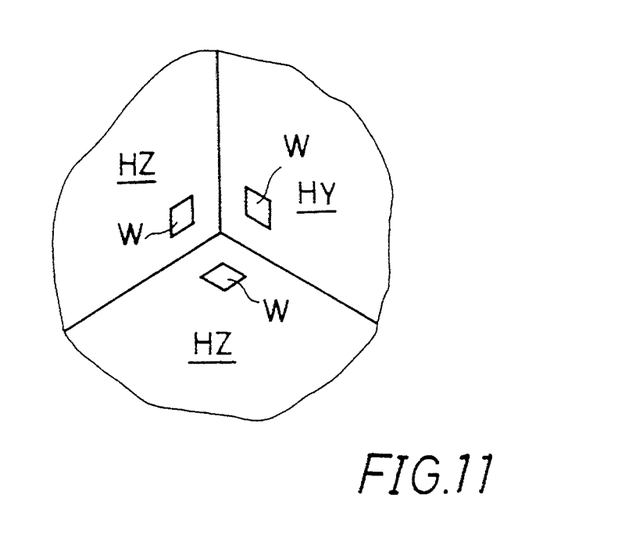
FIG. 11 shows an example of the honeycomb structure in accordance with a fourth embodiment of the present invention.

This embodiment uses through holes formed in the ribs, in place of elimination of any ribs as described in the first embodiment. FIG. 11 shows an example in which through holes W are formed in the vicinity of all corners of respective ribs HX, HY and HZ. Though three through holes are formed in each of the corners in FIG. 11, the least number of through holes each cell requires is two.

This construction assures communication among the cells through the through holes, permitting ready ejection of unsolidified liquid from the superficial model. The photo-solidified object according to the fourth embodiment is fabricated by a method in which the light exposure process for forming ribs is interrupted by a process of temporarily stopping light exposure.

As described above, the photo-solidified object provides a superficial model reinforced by an inner honeycomb structure having communication ports which permits communication among all cells of the honeycomb structure, so that unsolidified liquid can freely flow within the superficial model to be readily ejected from the model.

Consequently, the amount of the resin used for modeling can be reduced, and when the superficial model is used as a casting die, there will be no possibility of adverse effect of the remainder of unsolidified liquid.

The modeling method of the invention is effective to provide a honeycomb structure having communication ports formed for communication among the cells. Thus, a superficial model with an inner honeycomb structure having communication ports is fabricated in a shorter modeling time.

While the invention has been described with reference to preferred embodiments thereof, it is to be understood that modifications or variations may be easily made without departing from the scope of the present invention which is defined by the appended claims.

What is claimed is:

1. A method of fabricating a photo-solidified object including an outer surface and internal ribs supporting the outer surface, the internal ribs comprising a plurality of layers of internal rib portions, the outer surface and the internal ribs being integrally formed of a photo-solidifying resin, the method comprising the steps of:

forming one section of the outer surface by activating a light source to expose the resin at an area corresponding a contour of the object;

forming one layer of the internal rib portions by activating the light source to expose the resin at an internal area of the contour of the object; and repeating the steps of forming one section of the outer surface and forming one layer of the internal rib portions, wherein a first layer of internal rib portions is offset from a second layer of internal rib portions in one of an X direction and a Y direction and the first layer of internal rib portions is offset from a third layer of internal rib portions in an opposite one of the X direction and the Y direction.

2. A method of fabricating a photo-solidified object including an outer surface and internal ribs supporting the outer surface, the internal ribs comprising a plurality of layers of internal rib portions, the outer surface and the internal ribs being integrally formed of a photo-solidifying resin, the method comprising the steps of:

forming one section of the outer surface by activating a light source to expose the resin at an area corresponding to a contour of the object;

forming one layer of the internal rib portions by activating a light source to expose the resin at an internal area of the contour of the object; and repeating the steps of forming one section of the outer surface and forming one layer of the internal rib portions, wherein the light source is deactivated along the X axis for at least a first layer and the light source is deactivated along the Y axis for at least a second layer.

3. The method of claim 2, wherein the first layer and the second layer are provided at an area of the object having a maximum width.

* * * * *